April 30, 1929.  G. A. BOUVIER  1,711,168
APPARATUS FOR PRODUCING RECIPROCATING MECHANICAL MOVEMENT
Filed Nov. 30, 1926
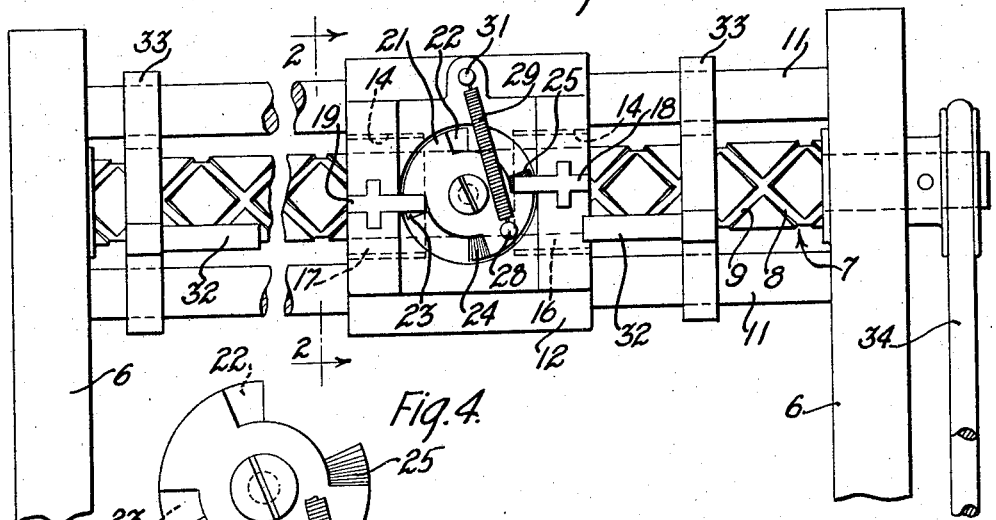
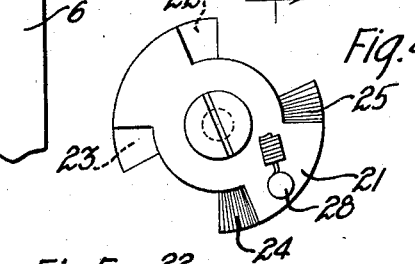
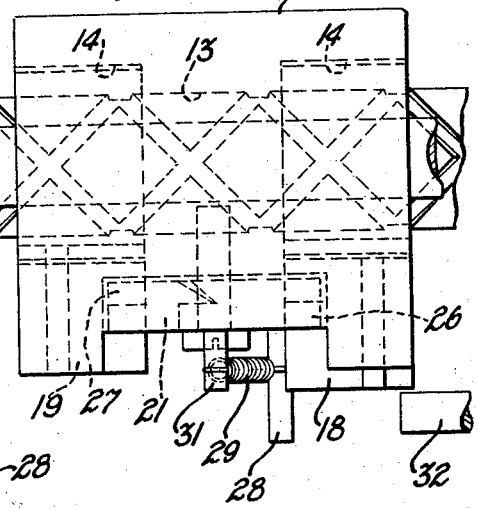
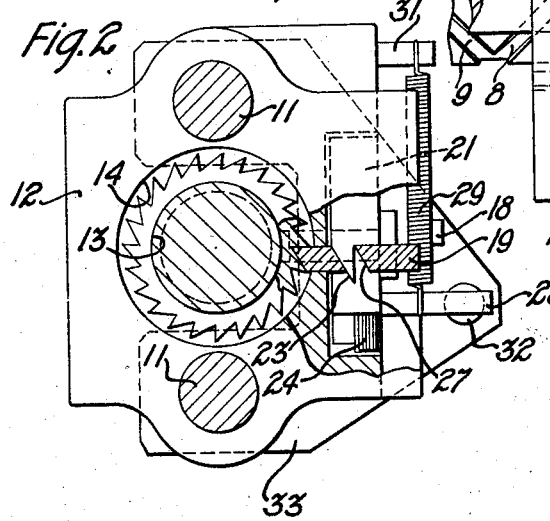
Inventor
George A. Bouvier
by [signature] Att'y.

Patented Apr. 30, 1929.

1,711,168

UNITED STATES PATENT OFFICE.

GEORGE ALFRED BOUVIER, OF OAK PARK, ILLINOIS, ASSIGNOR TO WESTERN ELECTRIC COMPANY, INCORPORATED, OF NEW YORK, N. Y., A CORPORATION OF NEW YORK.

APPARATUS FOR PRODUCING RECIPROCATING MECHANICAL MOVEMENT.

Application filed November 30, 1926. Serial No. 151,677.

This invention relates to apparatus for producing reciprocating mechanical movement, and more particularly to apparatus for converting rotary movement into reciprocating movement.

An object of the invention is to provide an apparatus for producing a variable stroke reciprocating movement having automatic compensation for wear and in which the reversal of the reciprocating element occurs substantially instantaneously.

In accordance with one embodiment thereof, the invention contemplates the provision of a pair of oppositely threaded nuts mounted on a double threaded shaft in such a manner that each nut is constantly in contact with the same side of the thread to eliminate lost motion due to wear and a quick action device is provided to change the direction of movement of the reciprocating element.

It is believed that a complete understanding of the invention may be had by reference to the following description taken in conjunction with the accompanying drawings, in which Fig. 1 is a side elevation of the apparatus for producing reciprocating movement;

Fig. 2 is an end view of the reciprocating element taken on line 2—2 of Fig. 1 with parts broken away to show the reversing mechanism;

Fig. 3 is a plan view of the reciprocating element;

Fig. 4 is a detail view of a disk-shaped cam used in the apparatus, and

Fig. 5 is an end view of Fig. 4.

Referring to the drawings in which similar reference characters designate the same parts in the several views, the apparatus is shown mounted on a pair of standards 6—6 in which a shaft 7 having two threads, one superimposed on the other, is rotatably mounted. One of the threads is a right hand thread 8 having a pitch of 45 degrees and the other thread 9 is a left hand thread of the same pitch. The standards also carry a pair of rods 11—11, one of which is disposed above and the other below the shaft, and a casing 12 is slidably mounted on the rods. The casing is provided with a circular aperture 13 through which the shaft may pass. Adjacent the aperture and concentric therewith are two larger apertures 14—14 in which a pair of nuts 16 and 17 are loosely mounted, the nut 16 being provided with an internal right hand thread which engages the right hand thread 8 of the shaft 7 and the nut 17 having an internal left hand thread which engages the left hand thread 9 of the same shaft. The exterior cylindrical surfaces of the nuts 16 and 17 are provided with teeth which are adapted to be engaged by pawls 18 and 19, respectively, which are slidably mounted in the casing to selectively prevent the rotation of either nut in a clockwise direction, the direction of rotation of the shaft as viewed in Fig. 2.

When the pawl 18 is in engagement with the nut 16, the clockwise rotation of the shaft will cause the nut to travel along the shaft toward the left as viewed in Fig. 1, moving the casing 12 and the nut 17 with it. The nut 17, due to the fact that it is being pushed along the shaft, will be in engagement with the same side of the thread as when it is itself exerting the propelling force when the direction of movement is later reversed and, therefore, any wear of the thread will be automatically compensated for and no delay will occur in the reversing operation due to wear of the parts. When the pawl 19 is in engagement with the nut 17, the rotation of the shaft will cause the reciprocating element to travel toward the right.

The pawls are engaged with the nuts by means of a snap action mechanism which comprises a disk-shaped cam 21 which is pivotally mounted on the casing. The disk-shaped cam is provided with four cam surfaces 22, 23, 24 and 25. The cam surfaces 22 and 25 are so located that upon a pivoting of the cam about its axis they engage a slot 26 of the pawl 18 while the cam surfaces 23 and 24 will engage a slot 27 in the pawl 19. When the cam surface 23 engages the slot 27 of the pawl 19 the pawl will be moved inwardly and into engagement with the teeth of the nut 17, and when the cam surface 24 is in engagement with the slot 27 of the pawl 19 the pawl will be withdrawn and out of engagement with the teeth of the nut 17. Similarly, when the cam surface 25 is in engagement with the slot 26 of the pawl 18 the pawl will be withdrawn and out of engagement with the teeth, and when the cam surface 22 is in engagement with the slot 26 of the pawl 18 the pawl will be moved inwardly and in engagement with the teeth of the nut. The disk-shaped cam is provided with a pin 28 to which is attached a spring 29, the other end of which is attached to a pin 31 mounted on the casing 12.

As the reciprocating element moves along the shaft which is rotated continuously in one direction by the belt drive 34, the pin 28 will engage either of a pair of fingers 32—32 carried by U-shaped members 33—33 which are adjustably mounted on the rods 11—11. When the pin 28 comes into engagement with one of the fingers, the disk-shaped cam will be turned about its pivot, and as soon as the spring 29 passes the center line of the pivot of the disk-shaped cam the pivoting movement will be completed with a snap action causing the two opposite cam surfaces to engage the pawls, withdrawing the one and engaging the other, and thereby reversing the direction of movement of the reciprocating element. When the reciprocating element reaches the other extreme of its stroke, the opposite finger will engage the pin and pivot the disk-shaped cam about its axis to again reverse the direction of movement. It will be seen that by adjusting the position of the U-shaped members, the length of the stroke may be regulated as desired and the automatic compensation for wear and the snap action reversing mechanism insure a substantially instantaneous reversal of the reciprocating element at the end of each stroke.

It will be understood that the embodiment of the invention herein described and illustrated is merely a convenient and useful form of the invention, which is capable of many other modifications without departing from the spirit and scope of the invention.

What is claimed is:

1. In an apparatus for producing reciprocating movement, a shaft having two opposite threads, a nut engaging each of the threads and having exterior ratchet teeth, a pawl for engaging the teeth of each of the nuts to prevent its rotation, and means having a plurality of cam surfaces for engaging one of the pawls and disengaging the other with a snap action.

2. In an apparatus for producing reciprocating movement, a shaft having two opposite threads, a nut engaging each of the threads, a pawl provided with a slot for engaging each of the nuts, a cam having a plurality of cam surfaces for engaging the slots to actuate the pawls, and means for actuating the cam to selectively engage either pawl with its corresponding nut.

3. In an apparatus for producing reciprocating movement, a shaft having two opposite threads, a nut engaging each of the threads, a pair of rods parallel with the shaft, a casing slidably mounted on the rods, a pair of pawls slidably mounted in the casing for engaging the nuts, a cam pivotally mounted on the casing to actuate the pawls, and a pair of adjustable fingers carried by the rods to actuate the cam for reversing the direction of movement of the casing.

4. In an apparatus for producing reciprocating movement, a shaft having two opposite threads, a casing having a central aperture through which the shaft passes and a pair of apertures adjacent the central aperture, a nut engaging each of the threads of the shaft and having exterior projections, one of which nuts is loosely mounted in each of the last-named apertures, and spring controlled cam actuated means carried by the casing to selectively engage the exterior projections on either nut to propel the casing and the other nut along the shaft.

5. In an apparatus for producing reciprocating movement, a shaft having two opposite threads, a nut engaging each of the threads, a pair of rods parallel with the shaft, a casing slidably mounted on the rods, a pair of pawls slidably mounted in the casing for engaging the nuts, a cam pivotally mounted on the casing to actuate the pawls, and means for actuating the cam with a snap action.

In witness whereof, I hereunto subscribe my name this 15th day of November, A. D., 1926.

GEORGE ALFRED BOUVIER.